US011947571B2

(12) United States Patent
Hedayati et al.

(10) Patent No.: US 11,947,571 B2
(45) Date of Patent: Apr. 2, 2024

(54) EFFICIENT TAGGING OF CONTENT ITEMS USING MULTI-GRANULAR EMBEDDINGS

(71) Applicant: Microsoft Technology Licensing, LLC, Redmond, WA (US)

(72) Inventors: Fares Hedayati, Richmond, CA (US); Young Jin Yun, San Francisco, CA (US); Sneha Chaudhari, Santa Clara, CA (US); Mahesh Subhash Joshi, Belmont, CA (US); Gungor Polatkan, San Jose, CA (US); Gautam Borooah, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 17/235,325

(22) Filed: Apr. 20, 2021

(65) Prior Publication Data

US 2022/0335066 A1 Oct. 20, 2022

(51) Int. Cl.
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
CPC .............................. G06F 16/285; G06N 20/00
USPC ...................................................... 707/737
See application file for complete search history.

(56) References Cited

U.S. PATENT DOCUMENTS

| 11,200,288 | B1* | 12/2021 | Baker | G06F 16/24578 |
| 2003/0033287 | A1* | 2/2003 | Shanahan | G06F 16/93 |
| 2005/0027664 | A1* | 2/2005 | Johnson | G06F 40/45 |
| | | | | 706/12 |
| 2019/0311301 | A1* | 10/2019 | Pyati | G06F 16/901 |
| 2021/0004437 | A1* | 1/2021 | Zhang | G06F 40/205 |
| 2021/0004682 | A1* | 1/2021 | Gong | G06N 3/08 |
| 2021/0103854 | A1* | 4/2021 | Misra | G06N 5/022 |
| 2021/0182291 | A1* | 6/2021 | Yoldemir | G06F 16/3329 |
| 2021/0182496 | A1* | 6/2021 | Shi | G06N 20/00 |
| 2021/0241363 | A1* | 8/2021 | Yang | G06N 20/00 |
| 2021/0287129 | A1* | 9/2021 | Saito | G06N 3/045 |
| 2022/0327100 | A1* | 10/2022 | Olsen | G06F 16/285 |

* cited by examiner

*Primary Examiner* — Son T Hoang
*Assistant Examiner* — Earl Levi Elias
(74) *Attorney, Agent, or Firm* — NICHOLSON DE VOS WEBSTER & ELLIOTT LLP (57) ABSTRACT

Efficient tagging of content items using content embeddings are provided. In one technique, multiple content items are stored a content embedding for content item is stored. Entity names are also stored along with an entity name embedding for each entity name. For each content item, (1) multiple content embeddings that are associated with the content item are identified; (2) a subset of the entity names is identified; and (3) for each entity name in the subset, (i) an embedding of the entity name is identified, (ii) similarity measures are generated based on the entity name embedding and the multiple content embeddings, (iii), a distribution of the similarity measures is generated, (iv) feature values are generated based on the distribution, (v) the feature values are input into a machine-learned classifier, and (vi) based on output from the classifier, it is determined whether to associate the entity name with the content item.

17 Claims, 5 Drawing Sheets

EFFICIENT TAGGING OF CONTENT ITEMS USING MULTI-GRANULAR EMBEDDINGS

TECHNICAL FIELD

The present disclosure relates to machine-learned embeddings and, more particularly to, efficiently tagging content items using machine-learned embeddings of different token lengths.

BACKGROUND

Some content distribution platforms host a significant number of content items. End users, operating their respective computing devices, connect to content distribution platforms to access content on demand, such as video content or textual content. However, the quantity of the content items makes it difficult for users to efficiently find relevant content items. Some content distribution platforms include systems for identifying potentially relevant content for specific end users. Such systems may take into account a history of which users consumed which content items in order to better identify relevant content for the same or other users.

However, some content items have little to no viewing history, such as new content items or content items that are transferred to a content distribution platform from a third-party source. Thus, factors that take into account viewing history (e.g., who viewed a content item) cannot be used to determine whether such content items might be relevant to end users. Without those factors, it is difficult to accurately predict whether an end user will view a third-party content item if information about that content item is presented to an end user. There are currently no known techniques for efficiently ingesting a significant quantity of third-party content items into a content distribution platform and determining their relevance for end users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for efficiently tagging content items using machine-learned embeddings of text of varying granularities are provided. In one technique, given a content item, a subset of entity names (e.g., skill names) is selected as candidates. For each candidate entity name, multiple feature values are calculated based on an embedding of the candidate entity name and multiple embeddings of the content item. The feature values are input into a machine-learned model, which outputs a value that is used to determine whether to associate the candidate entity name with the content item. After one or more entity names are associated with the content item, those entities are used to determine whether to transmit the content item (or information thereof) over a computer network to computing devices of end users. In this technique, a large multi-label (one for each possible entity name) classification problem is converted to a binary classification problem. Otherwise, in a multi-label classification scenario, due to the relatively few instances of some entities in a data set, the machine-learned model/classifier would be very inaccurate for a number of entity names.

In a related technique, some of the embeddings of a content item are embeddings that are generated based on different sentences in the content item or are generated based on different words in the content item. A similarity measure is calculated between each of those embeddings and the embedding of a candidate entity name, resulting in multiple similarity measures. A distribution of the similarity measures is generated. Some of the feature values are based on the distribution, such as different percentiles of similarity measures. This improves the accuracy of the machine-learned model.

In a related technique, negative training instances of the machine-learned model are automatically generated based on text associated with positive training instances and similarities between text of the positive and candidate negative instances. This technique improves the accuracy of the machine-learned model.

Embodiments improve computer-related technology related to automatically tagging (or associating) entity names with content items using machine-learning techniques by (1) decreasing the use of computing resources that would necessarily be required if a naïve consideration of each candidate entity name is performed and (2) increasing the accuracy of the machine-learned model that predicts whether a candidate entity name should be associated with a content item.

System Overview

Figure 1:
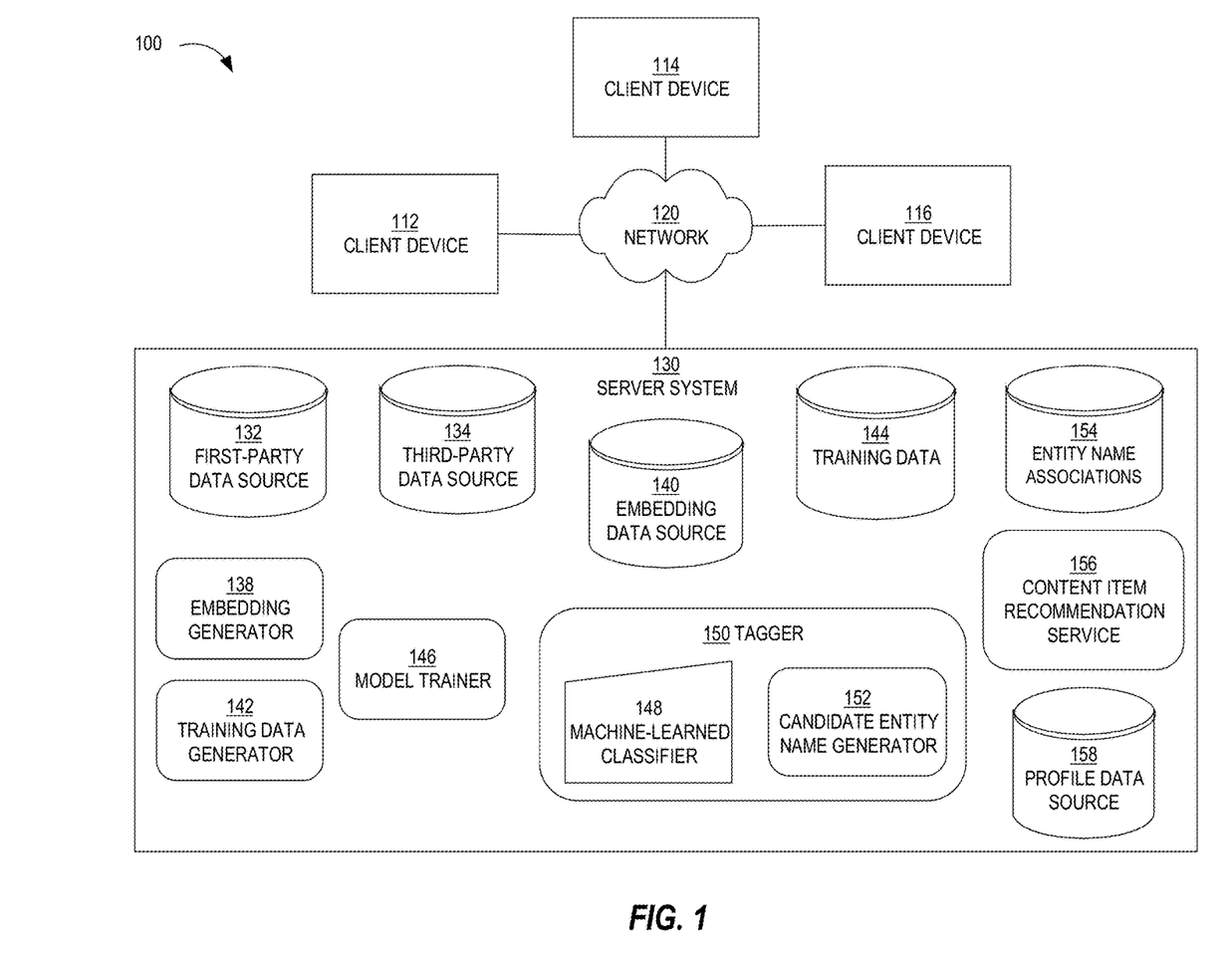
FIG. 1 is a block diagram that depicts an example system for efficiently tagging content items, in an embodiment.

FIG. 1 is a block diagram that depicts an example system 100 for efficiently tagging content items, in an embodiment. System 100 includes client devices 112-116, a network 120, and a server system 130. Although only three client devices are depicted, many client devices may be communicatively coupled to server system 130 through network 120 and/or other networks (not depicted). Server system 130 comprises one or more computing elements that perform the operations described herein as being performed by server system 130.

Network 120 is a computer network, examples of which include a local area network (LAN), a wide area network (WAN), and the Internet.

Examples of client devices 112-116 include a desktop computer, a laptop computer, a tablet computer, a wearable device, a video game console, and a smartphone.

A client device may receive content from server system 130 in response to transmitting a content request over network 120 to server system 130. Examples of a content request include a search request and a page request. A search request includes one or more query terms that are entered through the client device through one or more ways, such as through a physical keyboard of the client device or a graphical keyboard that is presented on a touchscreen display of client device 112. A page request includes a uniform resource locator (URL) that server system 130 hosts.

A client application executing on the client device transmits the content request to server system 130. Examples of such a client application include (1) a web application that executes within a web browser that executes on the client device and (2) a native application that is installed on the client device and is configured to communicate with server system 130.

A client device may receive content from server system 130 not in response to a content request from the client device. For example, server system 130 identifies content that server system 130 determines is relevant to a user of the client device and sends, to the client device or to an account of the user, a notification of the content in the form of an instant message, a text message, an email message, a push notification, or an in-app notification. Later, the user, operating the client device or another device, views the notification and determines whether to select any links to content found in the notification, the links referencing content hosted by server system 130 and/or another computer system.

Content Item

A content item is an item of content that contains one or more types of content, such as video content, audio content, 3D content, graphics content, and textual content. One type of content item may contain multiple types of content. For example, a video item may contain audio content and/or textual content in addition to video content.

Different types of content items require different types of applications to process the content items. For example, a text document may require a word processing application to process and display the textual content. Examples of text documents include Microsoft Word documents and Acrobat PDF documents. As another example, video content is playable by a video player on computing devices, such as client devices 112-116. A video player may be a standalone application that is installed and executes on a computing device or may execute within another application, such as a web application.

The subject matter of a content item may vary greatly, such as user-generated content (e.g., from an end-user's smartphone camera), an educational video produced by an organization (e.g., a company, academic institution, or other business entity), a word processing document describing a popular activity, and a video for entertainment purposes only.

A content item may be associated with one or more metadata. Metadata may be textual and/or graphical. An icon is an example of graphical metadata. Example textual metadata include a title, a description, an industry name (e.g., Finance, Software Technology, Agriculture), a pre-defined category (e.g., Educational, Sports, Fashion, Politics, Viral), a length of the content item (e.g., in time for audio content and video content; in number of pages and/or characters for textual content), a number of users who have viewed and/or requested the content item, a number of times the content item has been viewed and/or requested, a set of prerequisite skills that a user is recommended to need to understand content of the content item, and a set of acquirable skills that a user is to gain by viewing/reading/listening to content of the content item.

Server System

Server system 130 includes a first-party data source 132, a third-party data source 134, an entity name data source 136, an embedding generator 138, embedding data source 140, a training data generator 142, training data 144, model trainer 146, machine-learned classifier 148, tagger 150, candidate entity name generator 152, entity name associations 154, a content item recommendation service 156, and a profile data source 158. Each of computing elements 138, 142, 146, 150, 152, and 156 is implemented in software, hardware, or a combination of software and software. Also, two or more of computing elements 138, 142, 146, 150, 152, and 156 may be implemented in one or more programs or services. For example, the functionality of training data generator 142 and of model trainer 146 may be implemented in the same program. Similarly, data sources 132, 134, 136, 140, 144, 154, and 158 may reside on the same storage or on different storages relative to each other, such as volatile storage (e.g., main memory) or non-volatile storage. For example, embedding data source 140 may reside on a different storage device than entity name associations 154. Also, a data source may reside on the same device upon which a computing element executes. For example, embedding data source 140 may reside in memory of the same device upon which embedding generator 138 executes. Examples of non-volatile storage include a relational database, an object-relational database, and a key-value store.

Input Data Sources

First-party data source 132 contains first-party content items. A first-party content item is a content item that is "known" to the party or entity that owns and/or operates server system 130, such as LinkedIn. A content item is "known" if server system 130 has access to high quality metadata of the content item, such as certain attributes of the content item, examples of which include an industry associated with the corresponding content item, a set of skills associated with the corresponding content item, and a pre-defined category of information. High quality metadata attributes are typically difficult to add programmatically.

Third-party data source 134 contains third-party content items. The number of content items in data source 134 may be an order of magnitude greater than the number of content items in data source 132. For example, data source 132 may contain ten thousand content items while data source may contain one hundred thousand content items. A third-party content item is a content item that is not known to the party or entity that owns and/or operates server system 130. A content item is not known if server system 130 does not have access to certain attributes of the content item.

In addition to storing the content of each content item, data sources 132-134 may include, for each content item stored therein, a content item identifier that uniquely identifies the content item relative to all other content items in data source 132 and/or data source 134. Data sources 132-134 may also include metadata associated with the content item.

Entity name data source 136 contains a list of entity names. An example of an entity name is a name of a skill. Embodiments are not limited to any particular type of textual entity. Embodiments are applicable to any type of textual entity. The list of entity names may be standardized. Thus, each entity name in the list may be confirmed by a human user, such as an administrator of server system 130. Users of server system 130 may be limited to specifying, in their respective profiles (e.g., in profile data source 158), only entity names that are found in entity name data source 136. Server system 130 may reject any user attempts at specifying (or at least causing to be stored in their respective profiles) an entity name that is not found in entity name data source 136. Instead, server system 130 may present on a computer device of a user, based on input (e.g., a past or current job title, job function, industry, employer name, and academic degree(s) earned) from the user, one or more entity names in entity name data source 136 as suggestions or completions of incomplete textual input.

Embedding Generator

Embedding generator 138 generates one or more embeddings for a content item based on one or more text portions associated with the content item (e.g., where the text portions are metadata of the content item) and stores the embedding(s) in embedding data source 140. Example text portions include a title of the content item, a description of the content item, an individual word in the content item, a sentence in the content item, and multiple sentences in the content item. An embedding is a sequence of real values, such as two hundred and fifty, each value corresponding to a different dimension. Embedding generator 138 may comprise a neural network that has been trained on a corpus of text data. An example of embedding generator 138 is one that is based on Universal Sentence Encoder (USE), which encodes a set of text into a high-dimensional vector that can be used for text classification, semantic similarity, clustering, and other natural language tasks.

A USE model is trained and optimized for greater-than-word length text, such as sentences, phrases, or short paragraphs. The USE model may be trained on a variety of data sources and a variety of tasks with the aim of dynamically accommodating a wide variety of natural language understanding tasks. The input to the USE model is a variable length English text and the output is a 512-dimensional vector. The USE model is trained with a deep averaging network (DAN) encoder.

Another example of embedding generator 138 is a BERT encoder. BERT (Bidirectional Encoder Representations from Transformers) is a Transformer-based machine learning technique for natural language processing (NLP) pre-training. Unlike previous models, BERT is a bidirectional, unsupervised language representation, pre-trained using a plain text corpus. Context-free models (such as word2vec) generate a single word embedding representation for each word in a vocabulary, whereas BERT takes into account the context for each occurrence of a given word. For instance, whereas the vector for "running" will have the same word2vec vector representation for both of its occurrences in the sentences "He is running a company" and "He is running a marathon," BERT will provide a contextualized embedding that will be different according to the sentence. A phrase/sentence embedding may be generated using a BERT encoder.

Another example of embedding generator 138 is one that is based on fastText, which is a library for "learning" (i.e., generating) word embeddings and text classification. The fasteText model allows for the creation of an unsupervised learning or supervised learning algorithm for obtaining embeddings (or vector representations) for words. fastText uses a neural network for word embedding. Another example of a word embedding generation technique is Word2vec, which also uses a neural network model to learn word associations from a large corpus of text.

In an embodiment, embedding generator 138 generates multiple embeddings for a content item. For example, embedding generator 138 generates a single document embedding for a content item (e.g., based on a title and a description of the content item or based on all text of the content item), multiple sentence embeddings for the content item (i.e., one for each of multiple sentences in or associated with the content item), and/or multiple word embeddings (i.e., one for each of multiple words in or associated with the content item). Word embeddings may be generated only for "key" words associated with a content item, such as any words that are considered common words (or "stop words"), such as "the" and "and."

In a related embodiment, embedding generator 138 implements multiple embedding generation techniques, one for different types of content within a content item. For example, embedding generator 138 uses (1) a first embedding generation technique for generating words embeddings for words associated with a content item and (2) a second embedding generation technique for generating sentence embeddings and a document embedding based on sentences associated with the content item. Examples of word embedding generation techniques include word2vec and fastText, while an example of a sentence and document embedding generation technique is USE.

Embedding generator 138 may implement a sentence identification technique that identifies different sentences within a content item or document. A sentence may begin with a capital letter and end in a period. Additionally, a sentence may start after a comma, a semi-colon or a colon, while a sentence may end with comma, a semi-colon, or a colon.

Embedding generator 138 also generates an embedding for each entity name of one or more entity names stored in entity name data source 136. If an entity name comprises multiple words or tokens (e.g., "software engineer"), then embedding generator 138 may generate an embedding for each word or token and then computes an average embedding based on the multiple generated embeddings.

The embedding generation technique implemented by embedding generator 138 for generating embeddings for content items may be different than the embedding generation technique for generating embeddings for entity names. For example, embedding generator 138 uses fastText for generating embeddings for entity names, while embedding generator 138 (or another component of server system 130 not depicted) uses fastText for generating word embeddings for words associated with content items and USE embeddings for generating sentence embeddings for individual sentences within content items and/or for generating document embeddings for the content items.

Embedding data source 140 associates an embedding (generated by embedding generator 138) with the content item or entity name from which the embedding was generated. For example, embedding data source 140 may be a key-value data store, where the key is a content item identifier (or an entity name identifier) and the value is one or more embeddings of that content item (or entity name).

Embedding data source 140 may reside in the same or different storage devices upon which data sources 132-136 reside. For example, each of data sources 132-136 includes an embedding (generated by embedding generator 138) that is stored in association with the corresponding content item or entity name. Thus, given a content item identifier, a process may locate not only the content item itself, but also its metadata and one or more embeddings generated from and associated with the content item. Similarly, given an entity name or an entity name identifier, a process may locate an embedding generated from and associated with the entity name.

Training Data Generator

Training data generator 142 generates training data 144 for training a machine-learned classifier 148. Training data 144 comprises training instances. Each training instance associates an entity name with a content item and includes feature values that are based on that entity name and that content item. Each training instance includes a label that indicates whether the entity name is an accurate entity name to be associated with the content item. For example, the entity name may indicate a skill that the content item discusses or teaches those who consume (e.g., watch, read, and/or listen to) the content item. A positive training instance is one that has a positive label (e.g., 1) while a negative training instance is one that has a negative label (e.g., 0).

Training data generator 142 computes feature values for a training instance based on a definition of the features of machine-learned classifier 148.

Examples features of machine-learned classifier 148 include:
a. whether an entity name is found in a title of a content item,
b. whether the entity name is found in a description of the content item,
c. whether a token or word in a multi-token entity name is found in the content item,
d. a similarity measure (or similarity score) between an embedding of the entity name and a document embedding of the content item,
e. the highest similarity measure between the embedding of the entity name and a sentence embedding (among multiple sentence embeddings) of the content item,
f. a mean/median similarity measure among the similarity measures between the embedding of the entity name and the sentence embeddings of the content item,
g. the highest similarity measure between the embedding of the entity name and a word embedding (among multiple word embeddings) of the content item, and
h. a mean/median similarity measure among the similarity measures between the embedding of the entity name and the word embeddings of the content item.

In order to generate values for some of these features, multiple similarity measures are generated. For example, to identify the highest similarity measure between an embedding of an entity name and a sentence embedding of a content item, training data generator 142 identifies multiple sentence embeddings (e.g., generated by embedding generator 138) associated with the content item, each sentence embedding corresponding to a different sentence in the content item. Training data generator 142 computes a similarity measure between each sentence embedding and the entity name embedding, resulting in a set of similarity measures. Thus, the number of similarity measures in the set is equal to the number of sentence embeddings. Then, training data generator 142 identifies the greatest or highest similarity measure in the set.

In an embodiment, training data generator 142 determines multiple similarity measures for certain percentiles in a distribution of similarity measures are used as features of machine-learned classifier 148. The distribution is a set of ordered similarity measures. Example percentiles include the 10th percentile, 20th percentile, etc., up to the 90th percentile. Each similarity measure represents a similarity between an embedding of an entity name and an embedding of a word or sentence in the content item.

Figure 2:
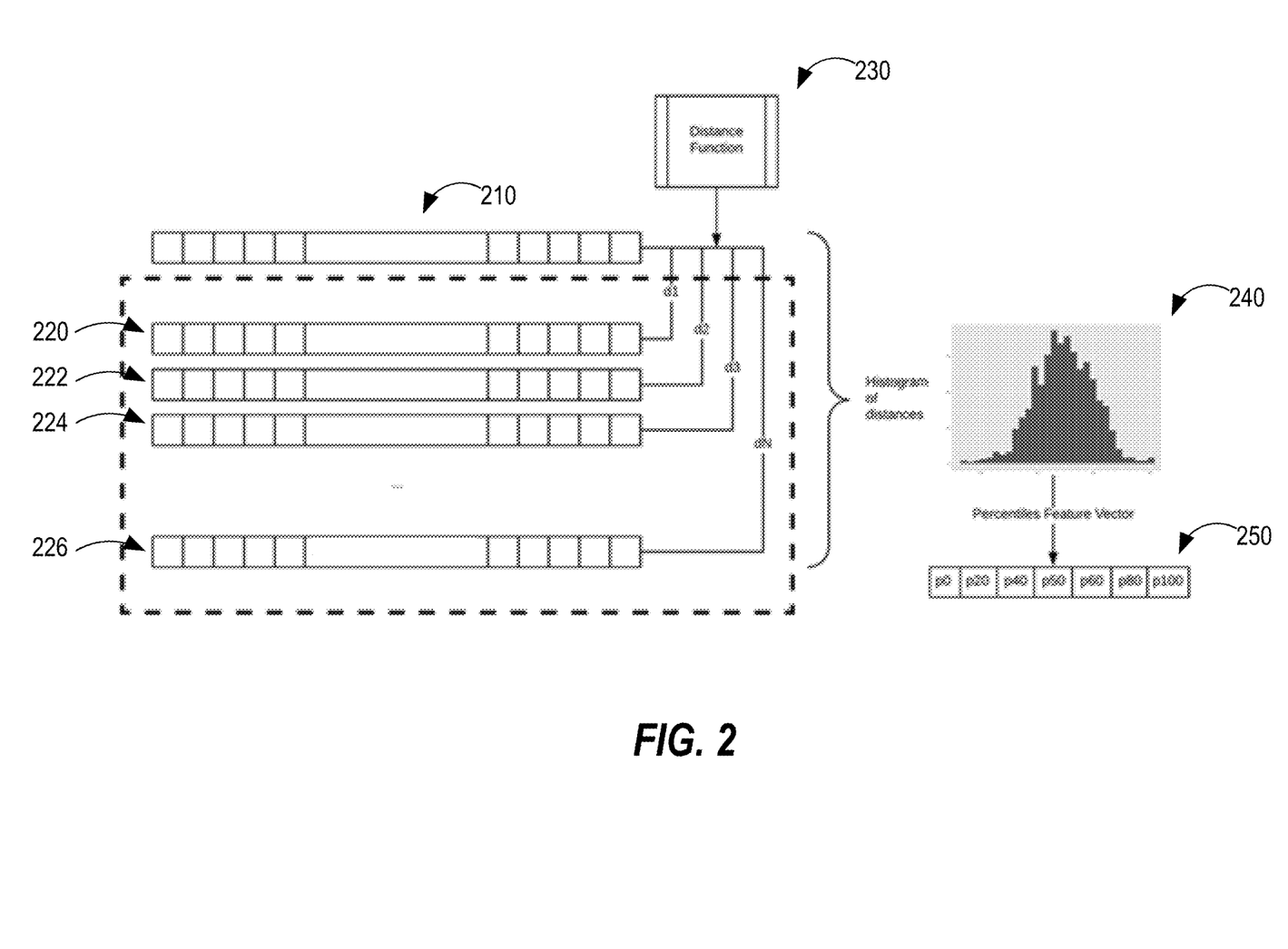
FIG. 2 is a diagram that depicts a process for generating a distribution from which feature values may be extracted for input to a machine-learned classifier, in an embodiment.

FIG. 2 is a diagram that depicts a process for generating a distribution from which feature values may be extracted for input to a machine-learned classifier, in an embodiment. The diagram depicts an entity name embedding 210 and multiple embeddings 220-226 associated with a content item. The embeddings associated with a content item may be word embeddings or sentence embeddings. A distance function 230 (e.g., cosine similarity) is applied to each entity name embedding-content item embedding pair to generate a similarity measure. Thus, if there are one hundred words in the content item, then there are one hundred word embeddings and one hundred similarity scores that are generated by the distance function. The similarity measures are organized (e.g., by ascending or descending order) to generate distribution 240. From distribution 240, multiple feature values 250 are extracted, depending on the features of the machine-learned classifier. In the depicted example, feature values 250 are the similarity measure at the $0^{th}$ percentile, the similarity measure at the $20^{th}$ percentile, the similarity measure at the $40^{th}$ percentile, the similarity measure at the $50^{th}$ percentile, the similarity measure at the $60^{th}$ percentile, the similarity measure at the $80^{th}$ percentile, and the similarity measure at the $100^{th}$ percentile.

Example types of similarity measures include cosine similarity, dot product, and Euclidean distance. In order to generate a similarity measure between two embeddings, the size of each embedding is the same. For example, both embeddings comprise one hundred values.

Generating Negative Training Instances

As noted above, in an embodiment, training data generator 142 generates negative training instances. A negative training instance comprises multiple feature values pertaining to an entity name and a content item and label (e.g., 0) indicating that the entity name is not an entity name that should be associated with the content item.

A negative training instance may be generated somewhat randomly based on a given set of known positive examples. For example, given an existing mapping of entity names to content items and a set of all possible (e.g., standardized) entity names, training data generator 142 selects (e.g., randomly) a content item (e.g., from the first-party data source 132), randomly selects an entity name from the set of entity names, and determines whether the entity name is already associated with the selected content item. If so, then another entity name is randomly selected from the set of entity names. If not, then the entity name and the content item are used to generate a negative training instance.

As another example, a negative training instance is generated less randomly by identifying one or more entity names that do not co-occur often with another entity name in a profile (e.g., found in profile data source 158). The profile may be a user profile or an organization profile. Information in a profile may be populated by the user (or a representative of the organization) that is being described by the profile. Thus, training data generator 142 selects a content item (e.g., from first-party data source 132), identifies an entity name that is already associated with the content item, and identifies one or more other entity names that never or rarely co-occur with the identified entity name in profiles of profile data source 158. If another entity name co-occurs with the identified entity name in profiles less than 0.1% of all the times that identified entity name appears in the profiles, then the other entity name is used to generate a negative training instance.

One measurement of co-occurrence that may be used is pointwise mutual information (PMI), which is a measure of association used in information theory and statistics. PMI is used to quantify the likelihood of co-occurrence of two words, taking into account the fact that the co-occurrence might be caused by the frequency of the single words. The PMI of a pair of entity names A and B may be computed by computing the log of the ratio of (1) the probability of A and B together to (2) the product of the probability of A and the probability of B. Two entity names may be considered as rarely co-occurring if the PMI of them is negative.

Generating "Hard" Negative Training Instances

In an embodiment, training data generator 142 generates a "hard" negative training instance. A hard negative training instance is one that is computed in a similar manner as described above and where there is a semantic similarity or lexical similarity between (1) one or more words or tokens in the negative entity name and (2) one or more words or tokens in the positive entity name (i.e., one that is already associated with a content item).

For example, a positive entity name is "code manager" while a negative entity name is "HR manager." The two entity names may rarely (if ever) co-occur in the same profile; however, both entity names have a common word: "manager." Thus, there is lexical similarity between the two entity names.

As another example, a positive entity name is "software engineer" while a negative entity name is "civil engineering lead." The two entity names may rarely (if ever) co-occur in the same profile and the two entity names do not have matching words. However, the root (i.e., "engineer") of the second word of the negative entity name matches the second word of the positive entity name. Again, there is lexical similarity between the two entity names.

Also, there is semantic similarity between these two entity names. Semantic similarly may be determined by generating an embedding for each word in each entity name and comparing each embedding in one entity name to each embedding in the other entity name. If a comparison results in a similarity measure that is above a certain threshold (e.g., 0.6), then it is determined that these two entity names have semantic similarity.

Semantic similarity may be determined by a process executing in server system 130 that considers each possible pair of known entity names. For example, if the known entity names are three thousand in number, then the number of possible pairs of entity names to consider may be over four million pairs. However, this large number of calculations may be performed offline and does not need to be performed often unless the embeddings to words in the entity names change often. For each pair of entity names that is considered to be semantically similar, the process stores mapping data that associates the pair of entity names. Such a pair of entity names is a candidate pair for determining how often they co-occur in a set of documents, such as user profiles, which may be found in profile data source 158. If that pair of entity names co-occur less than a particular threshold, then each entity name in the pair of entity names may be considered a hard negative sample for the other entity name in the pair.

Figure 3:
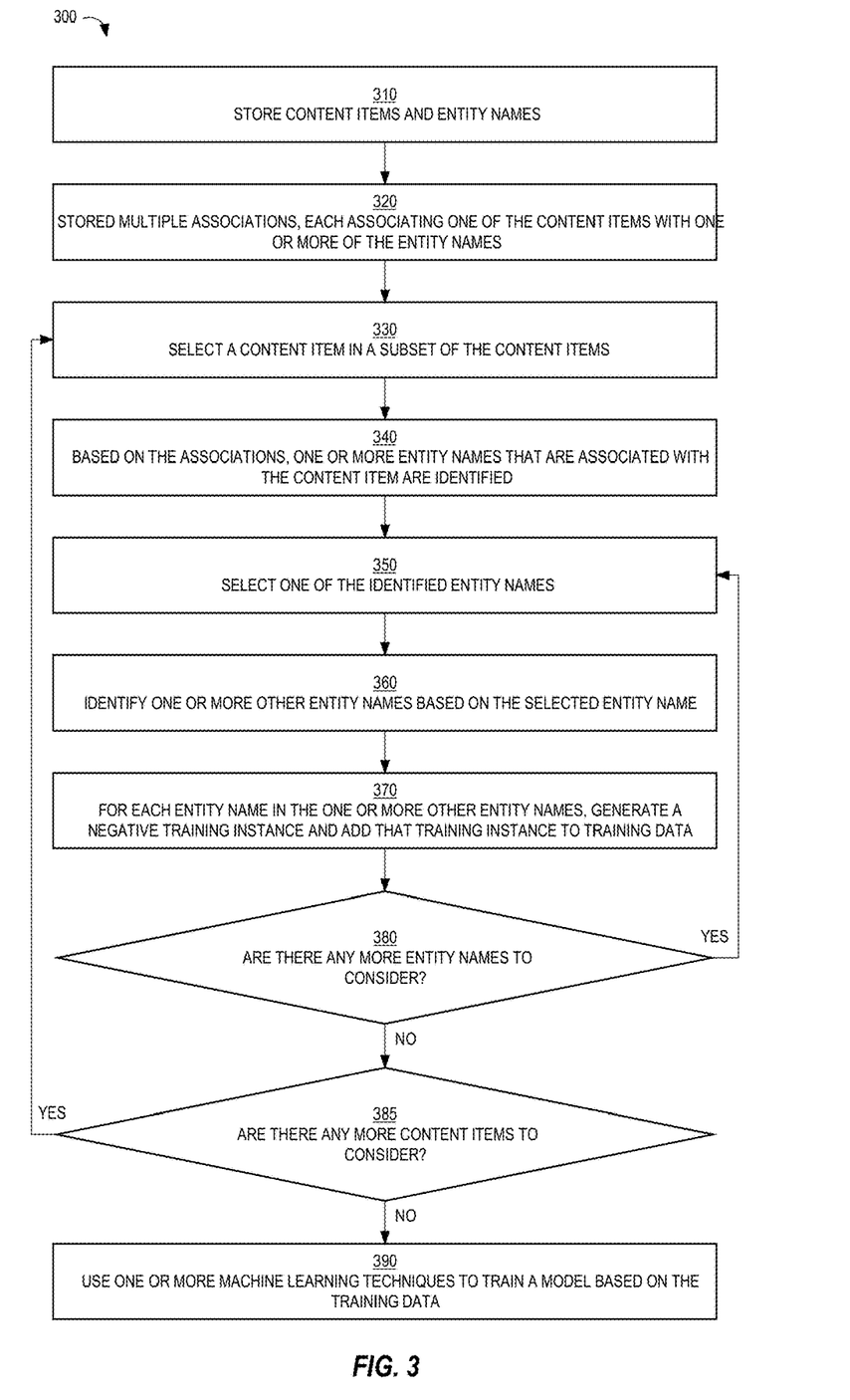
FIG. 3 is a flow diagram that depicts an example process for generating hard negative instances, in an embodiment.

FIG. 3 is a flow diagram that depicts an example process 300 for generating hard negative instances, in an embodiment. Portions of process 300 may be performed by training data generator 142.

At block 310, multiple content items and multiple entity names are stored. For example, some content items are stored in first-party data source 132 while other content items are stored in third-party data source 134. Also, entity names are stored in entity name data source 136.

At block 320, multiple associations are stored, each association associating one of the content items with one or more of the entity names. Each association may be stored in a record that includes information about an individual content item, such as a name of the content item, an author and/or source of the content item, a length of the content item (if the content item is a video), a size in bytes of the content item, and a reference to where the content item is stored in persistent storage.

At block 330, a content item in a subset of the content items is selected. The subset may be all the content items in first-party data source 132 or a strict subset of such content items. Block 330 may involve randomly selecting one of the content items in the subset or may involve selecting the first content item based on an order of the content items in the subset.

At block 340, based on the associations, one or more entity names that are associated with the content item are identified. If entity names are stored in records that include information about content items, then block 340 may involve reading a portion of a record of the selected content item.

At block 350, one of the identified entity names is selected. If multiple entity names are associated with the selected content item, then block 350 may involve randomly selecting one of the identified entity names or may involve selecting the first entity name based on an order of the identified entity names.

At block 360, one or more other entity names are identified. The one or more other entity names are textually similar to the selected entity name and cooccur with the identified entity name in multiple documents less than a threshold. The threshold may be a number (e.g., four) or a percentage representing, for example, a ratio of (a) the number of documents that contain both the other entity name and the selected entity name to (b) the number of documents that contain the selected entity name.

At block 370, for each particular entity name in the one or more other entity names, a negative training instance is generated and added to training data. The negative training instance is based on the particular entity name and the selected content item.

At block 380, it is determined whether there are any more entity names to consider. If so, then process 300 returns to block 350. Otherwise, process 300 proceeds to block 385. Alternatively, block 380 may be skipped and process 300 proceed directly to block 385. Alternatively still, block 380 may be performed a limited number of times per selected content item, such as two.

At block 385, it is determined whether there are any more content items to consider. If so, then process 300 returns to block 330. Otherwise, process 300 proceeds to block 390.

At block 390, one or more machine learning techniques are used to train a model based on the training data. At this point, the training data may contain both positive training instances and negative training instances. The positive training instances may be generated based on manual input (a) that previously associated entity names with content items or (b) that confirmed automatically associated entity names to content items.

The negative training instances may include both the "hard" negative instances automatically generated using a portion of process 300 and negative instances that were generated using another process. For example, some negative training instances may be generated (a) based on manual input that previously identified entity names as not being associated with content items or (b) automatically where a random entity name is selected and has a similarity measure (with a content item or a known positive entity name associated with the content item) that is below a certain threshold (where the similarity measure is based on comparing respective embeddings), indicating that there is little to no similarity between the randomly selected entity name and the content item in question.

Training a Machine-Learned Classifier

In an embodiment, model trainer 146 trains or generates machine-learned classifier 148 based on training data 144 using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on, at least in this scenario, known associations between entity names and content items. The statistical model is trained based on multiple attributes (or factors) described previously. In machine learning parlance, such attributes are referred to as "features." To generate and train a statistical model, a set of features is specified and a set of training data is identified.

Embodiments are not limited to any particular machine learning technique for generating or training a model. Example machine learning techniques include linear regression, logistic regression, random forests, naive Bayes, and Support Vector Machines (SVMs).

Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, training data may comprise, for each training instance, multiple feature values, each corresponding to a different feature. Example features include the features described previously. In order to generate the training data, information about each known entity name-content item pair is analyzed to compute the different feature values. In this example, the label (or dependent variable) of each training instance may be whether the entity name is associated with a content item.

In an embodiment, machine-learned classifier 148 is a binary classifier. In other words, machine-learned classifier 148 is trained to "learn" which features are predictive of whether an entity name should be associated with a content item.

Initially, the number of features that are considered for training may be significant. After training a machine-learned model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future models and computing output scores.

Entity Tagging: Example Process

Figure 4:
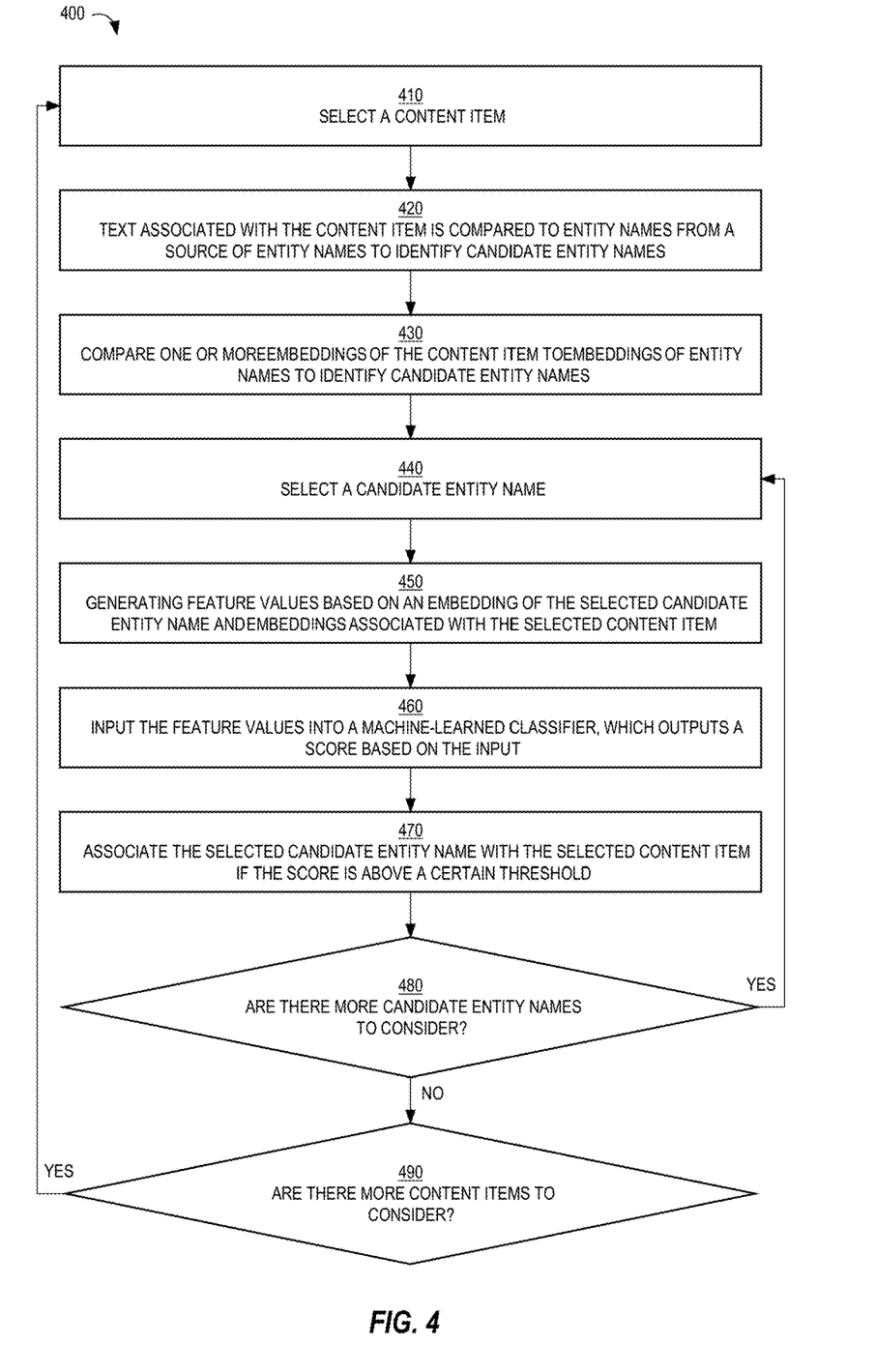
FIG. 4 is a flow diagram that depicts an example process for generating associations between entity names and content items, in an embodiment.

FIG. 4 is a flow diagram that depicts an example process 400 for generating associations between entity names and content items (also referred to as "entity tagging"), in an embodiment. Process 400 may be performed by one or more components of server system, such as tagger 150, which, in one implementation, comprises machine-learned classifier 148 and candidate entity name generator 152. Process 400 presumes that embeddings have already been generated and a machine-learned classifier has already been trained. Process 400 may be repeated automatically on a regular basis, such as daily, weekly, or monthly or in response to certain events, such as the addition of a certain number of new content items to third-party data source 134, the addition of a certain number of new content items to first-party data source, and/or the update to entity name associations of content items in first-party data source 132.

At block 410, a content item is selected. Block 410 may involve randomly selecting a content item from among content items stored in third-party data source 134.

At block 420, text associated with the content item is compared to entity names from entity name data source 136. Block 420 may involve considering all entity names stored in entity name data source 136. The text of the content item may be limited to the title of the content item and/or to a description of the content item. Block 420 may involve determine whether an entity name is found within the text of the content item. If so, then the entity name is a candidate entity name. Block 420 may also involve determining whether an entity name at least partially matches the text of the content item, such as at least half of the words or tokens in the entity name must match a portion of text within the text of the content item.

At block 430, one or more embeddings of the content item are compared to embeddings of entity names in entity name data source 136 or of the candidate entity names identified in block 420. Thus, block 430 may involve considering all entity names stored in entity name data source 136 or a relatively few candidate entity names identified in block 420. If the former, then process 400 identifies candidate entity names using two different techniques, one from block 420 and the other from block 430. If the latter, then process 400 might identify a relatively small number of entity names.

Block 430 may involve computing similarity measures between pairs of embeddings, where one of the embeddings in each pair is an embedding associated with the selected content item. An embedding associated with the selected content item may be a title embedding, a description embedding, or a document embedding.

In an embodiment, an embedding of an entity name is compared to multiple embeddings (e.g., title embedding, description embedding, and document embedding) of the selected content item. If at least one of the similarity measures is above a certain threshold, then the entity name is considered a candidate entity name. Alternatively, only if multiple of the similarity measures are above another (e.g., lower) threshold, then the entity name is considered a candidate entity name.

Each of blocks 420 and 430 results in a set of candidate entity names. The candidate entity names that are considered in block 440 may be an intersection of, or a union of, the set of candidate entity names identified as a result of block 420 and the set of candidate entity names identified as a result of block 430. Blocks 410-430 may be performed by candidate entity name generator 152.

At block 440, a candidate entity name is selected. The candidate entity name may be selected randomly from among the resulting candidate entity names. Blocks 440-490 may be performed by tagger 150.

At block 450, multiple features values are generated based on an embedding of the selected candidate entity name and embeddings associated with the selected content item. For example, one of the feature values may be generated based on title embedding of the selected content item, another one of the feature values may be generated based on a description embedding of the selected content item, and/or another set of the feature values may be generated based on certain percentiles in a distribution of similarity measures between the embedding of the selected candidate entity name and word embeddings of the selected content item.

If process 400 includes block 430, then some of the similarity measures that were generated as a result of block 430 for a candidate entity name may be identified as part of block 440 and, therefore, do not have to be generated again.

At block 460, the multiple feature values are input into the machine-learned classifier, which outputs a score.

At block 470, the candidate entity name selected in block 440 is associated with the selected content item if the score is above a certain threshold. Block 470 may involve updating an entry or record in third-party data source 134 corresponding to the selected content item to include a reference (e.g., an entity name identifier) that uniquely identifies the selected candidate entity name. Thus, entity name associations 154 are stored in third-party data source 134. Additionally or alternatively, block 470 may involve updating entity name associations 154 (that associates entity names with content items) to include an association or record that maps the candidate entity name to the selected content item.

At block 480, it is determined whether there are any more candidate entity names to consider. If so, then process 400 returns to block 440. Otherwise, process 400 proceeds to block 490.

At block 490, it is determined whether there are any more content items to consider. If so, then process 400 returns to block 410. Otherwise, process 400 may end.

With process 400, blocks 420 and 430 allow for a "coarse" filtering where a subset of all possible entity names are identified as candidate entity names. In this way, the machine-learned classifier is not required to be invoked for every entity name-content item pair. This approach saves a significant amount of computing resources because, in some techniques, generating a score for an entity name-content item pair requires the considering of many sentence embeddings of a content item and, optionally, many (e.g., thousands of) word embeddings of a content item.

Multiple Third-Party Data Sources

In an embodiment, third-party data source 134 comprises content items from different third-party entities. Content items from one third-party entity may share similar characteristics with each other while not sharing those same characteristics with content items from another third-party entity. For example, content items from one third-party entity might have both titles and descriptions while content items from another third-party entity might not have any descriptions. As another example, the descriptions of content items from one third-party entity tend to be relatively long (e.g., six or more sentences) while the descriptions of content items from another third-party entity tend to be relatively short (e.g., 2-3 sentences).

In a first embodiment, the maximum number of entity names that may be associated with a content item depends on the source of the content item, or the third-party entity that provided the content item to server system 130. For example, for content items from a first third-party entity, a maximum of five entity names may be associated with any one of the content items; while for content items from a second third-party entity, a maximum of three entity names may be associated with any one of the content items. This difference in maximum values may be due to the fact that the quantity and/or quality of the text associated with content items from the first third-party entity may be higher than the quantify and/or quality of the text associated with content items from the second third-party entity.

In a second embodiment, a different machine-learned classifier is trained and used for content items depending on the source of the content items. For example, a first machine-learned classifier is used for content items from a first third-party entity while a second machine-learned classifier is used for content items from a second third-party entity that is different than the first machine-learned classifier. The first machine-learned classifier may be trained based on training instances pertaining to content items from the first third-party entity while the second machine-learned classifier may be trained based on training instances pertaining to content items from the second third-party entity. Different machine-learned classifiers for different sources of content items depends on the content quality and the availability of metadata and labels. For example, if the content quality varies significantly based on source of content items, then there is greater utility is training and using different classifiers.

Use Case

Entity name associations 154, whether stored separately from the corresponding content items or within the content items (e.g., in third-party data source 134), may be used in one or more scenarios. For example, content item recommendation service 156 leverages entity name associations 154 to generate recommendations for users of server system 130, regardless of whether the users are actively searching server system 130 online. Content item recommendation service 156 identifies, for each of multiple users, one or more content items that are predicted to be interesting to the user, based on attributes of the user and attributes of the one or more content items, including the entity names associated with each content item. Content item recommendation service 156 may leverage a model, whether rules-based or machine-learned, that generates a score for each candidate user-content item pair. If the model produces, for a user-content item pair, a score that is above a certain threshold, then content item recommendation service 156 generates and stores an association between the content item and the user in the pair. Based on the association, data about the content item is presented to the user.

The timing of the presentation may vary from one implementation to another. For example, depending on the score, the time of day, preferences of the user, and/or historical interactions by the user (and, optionally, other users) to previous recommendations. As a specific example, if the score is above a certain threshold, then content item recommendation service 156 (or another component of server system 130) generates a notification that indicates the content item and causes the notification to be sent to a computing device of the user, such as a push notification or an in-app notification. (The notification may include a link to the content item and/or include content from the content item itself, such as a title of the content item, an author or source of the content item, and/or an abbreviated description of the content item.) If the score is below the certain threshold, then server system 130 waits until the user opens a particular application associated with server system 130 and only then presents the notification. Or the user might need to view a certain page view or ("notification") tab within the particular application to view the recommendation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
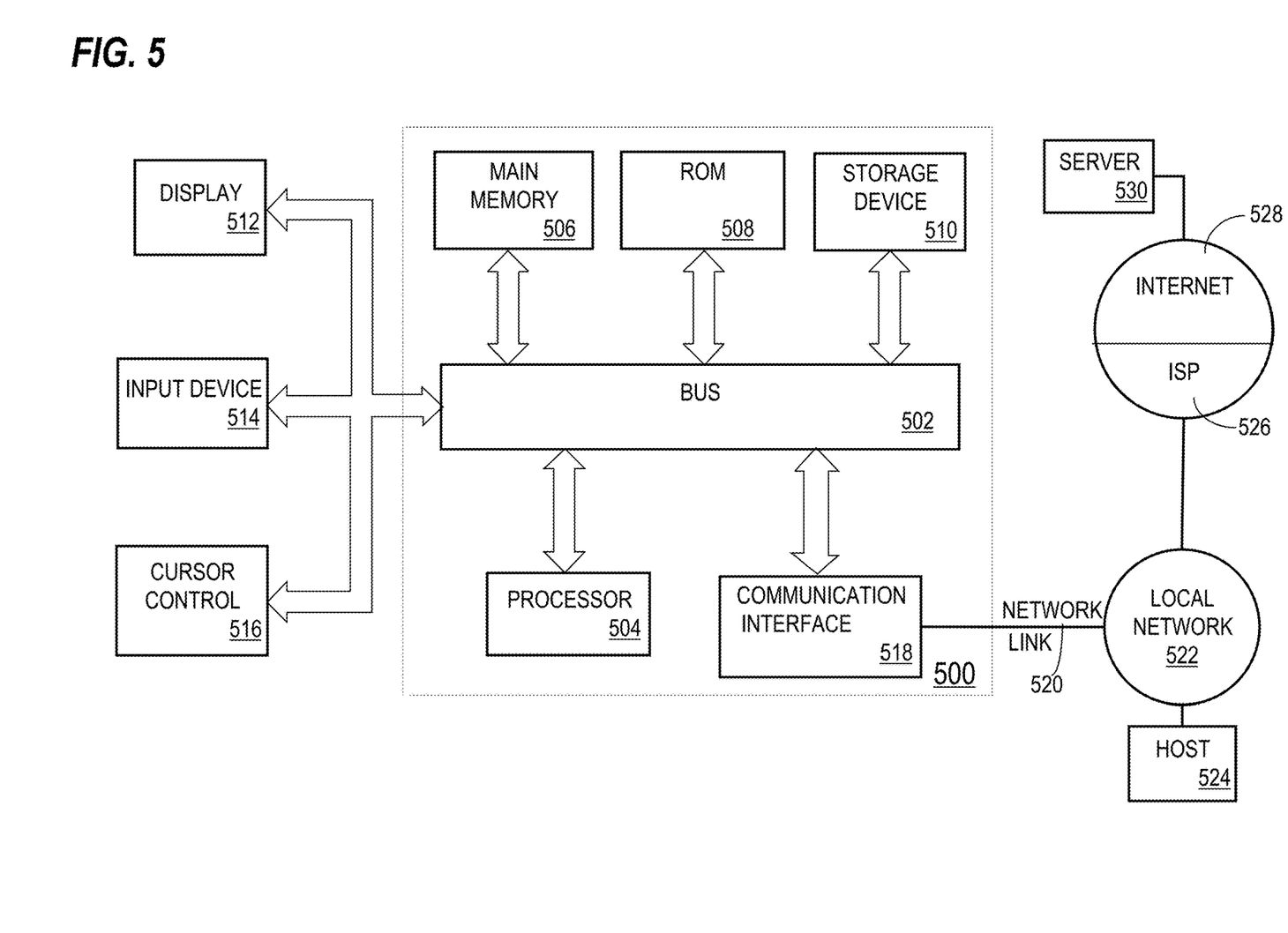
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a plurality of content items and, for each content item in the plurality of content items, a plurality of content embeddings associated with the content item;
    storing a plurality of entity names and a plurality of entity name embeddings, wherein each entity name embedding of the plurality of entity name embeddings is associated with a different entity name of the plurality of entity names;
    for a content item in the plurality of content items:
        identifying a subset of the plurality of entity names;
        for an entity name in the subset:
            generating a plurality of similarity scores, wherein a similarity score of the plurality of similarity scores is based on a similarity measure applied to an entity name embedding associated with the entity name and a content embedding of the plurality of content embeddings;
            generating a distribution of the plurality of similarity scores over the plurality of content embeddings;
            extracting a plurality of feature values from the distribution, wherein a feature value extracted from the distribution corresponds to a similarity score of the plurality of similarity scores at a percentile of the distribution;
            inputting the plurality of feature values extracted from the distribution into a binary classifier;
            generating, by the binary classifier, based on the plurality of feature values extracted from the distribution, a classification, wherein the classification indicates a likelihood of the entity name being associated with a content item of the plurality of content items, wherein the binary classifier is trained to learn features that are predictive of whether particular entity names are associated with particular content items;
            based on the classification, determining to associate the entity name with the content item; and
            based on the association of the entity name with the content item, determining to transmit the content item to a user computing device;
    wherein the method is performed by one or more computing devices.

2. The method of claim 1, wherein the content embedding of the plurality of content embeddings that is associated with the content item, is associated with (a) a different sentence of a plurality of sentences in the content item or (b) a different word of a plurality of words in the content item.

3. The method of claim 1, further comprising:
    storing, for the content item in the plurality of content items, a document embedding that is based on multiple sentences in the content item;
    wherein generating the plurality of similarity scores based on the similarity measure applied to the entity name embedding associated with the entity name and the content embedding of the plurality of content embeddings also comprises generating a particular similarity score based on the entity name embedding associated with the entity name and the document embedding of the content item;
    generating a particular feature value based on the particular similarity score;
    wherein inputting the plurality of feature values extracted from the distribution into the binary classifier also comprises inputting the particular feature value into the binary classifier to generate a classification of the entity name, wherein the classification indicates the likelihood of the entity name being associated with the content item.

4. The method of claim 1, wherein the content embedding in the plurality of content embeddings of a content item is based on a different word in the content item, the method further comprising:

storing, for the content item in the plurality of content items, a plurality of sentence embeddings, each of which is based on a different sentence in the content item;
wherein generating the plurality of similarity scores based on the similarity measure applied to the entity name embedding associated with the entity name and the content embedding of the plurality of content embeddings also comprises generating a second plurality of similarity scores based on the entity name embedding associated with the entity name and the plurality of sentence embeddings of the content item;
generating one or more feature values based on the second plurality of similarity scores;
wherein inputting the plurality of feature values extracted from the distribution into the binary classifier also comprises inputting the one or more feature values into the binary classifier.

5. The method of claim 4, further comprising:
computing a mean of the second plurality of similarity scores or a maximum of the second plurality of similarity scores;
wherein the one or more feature values are based on the mean or maximum.

6. The method of claim 1, wherein the classification of the entity name reflects a likelihood that the entity name is an accurate entity name for the content item.

7. The method of claim 1, wherein identifying the subset of the plurality of entity names comprises:
for the entity name in the plurality of entity names:
identifying a first entity name embedding that is associated with the entity name;
generating one or more similarity scores between the first entity name embedding and one or more embeddings associated with the content item;
including the entity name in the subset only if at least one of the one or more similarity scores is above a particular threshold.

8. A method comprising:
storing a plurality of content items and a plurality of entity names;
storing a plurality of associations, each association associating a content item of the plurality of content items with one or more entity names of the plurality of entity names;
identifying a first subset of entity names of the one or more entity names associated with the content item that share one or more tokens with one or more tokens of the content item;
identifying one or more other entity names of the first subset that co-occur with an entity name in a plurality of documents less than a threshold;
for each particular entity name in the one or more other entity names, generating, based on each particular entity name and each corresponding content item, a negative training instance and adding the negative training instance to training data;
using one or more machine learning techniques to train a model based on the training data;
wherein the method is performed by one or more computing devices.

9. The method of claim 8, further comprising:
for a content item in a second subset of the plurality of content items:
based on the plurality of associations, identifying one or more second entity names that are associated with the content item;
for an entity name of the one or more second entity names:
generating, based on the entity name and the corresponding content item, a positive training instance and adding the positive training instance to the training data;
wherein the model is trained based on the training data that includes positive training instances.

10. The method of claim 8, wherein the plurality of content items is a first plurality of content items, further comprising:
storing a second plurality of content items;
for a content item in the second plurality of content items:
identifying one or more embeddings of the content item;
identifying a second subset of the plurality of entity names of the content item;
for an entity name in the second subset of the plurality of entity names:
identifying an embedding of the entity name;
generating a plurality of feature values based on the one or more embeddings of the content item and the embedding of the entity name;
inserting the plurality of feature values into the model to generate a classification, wherein the classification indicates a likelihood of the entity name being associated with a content item of the plurality of content items;
based on the classification, determining to associate the entity name with the content item.

11. One or more storage media storing instructions which, when executed by one or more processors, cause:
storing a plurality of content items and, for each content item in the plurality of content items, a plurality of content embeddings associated with the content item;
storing a plurality of entity names and a plurality of entity name embeddings, wherein each entity name embedding of the plurality of entity name embeddings is associated with a different entity name of the plurality of entity names;
for a content item in the plurality of content items:
identifying a subset of the plurality of entity names;
for an entity name in the subset:
generating a plurality of similarity scores, wherein a similarity score of the plurality of similarity scores is based on a similarity measure applied to an entity name embedding associated with the entity name and a content embedding of the plurality of content embeddings;
generating a distribution of the plurality of similarity scores over the plurality of content embeddings;
extracting a plurality of feature values from the distribution, wherein a feature value extracted from the distribution corresponds to a similarity score of the plurality of similarity scores at a percentile of the distribution;
inputting the plurality of feature values extracted from the distribution into a binary classifier;
generating, by the binary classifier, based on the plurality of feature values extracted from the distribution, a classification, wherein the classification indicates a likelihood of the entity name being associated with a content item of the plurality of content items, wherein the binary classifier is trained to learn features that are predictive of whether particular entity names are associated with particular content items;

based on the classification, determining to associate the entity name with the content item; and based on the association of the entity name with the content item, determining to transmit the content item to a user computing device.

12. The one or more storage media of claim 11, wherein the content embedding of the plurality of content embeddings that is associated with the content item, is associated with (a) a different sentence of a plurality of sentences in the content item or (b) a different word of a plurality of words in the content item.

13. The one or more storage media of claim 11, wherein the instructions, when executed by one or more processors, further cause:

storing, for the content item in the plurality of content items, a document embedding that is based on multiple sentences in the content item;

wherein generating the plurality of similarity scores based on the similarity measure applied to the entity name embedding associated with the entity name and the content embedding of the plurality of content embeddings also comprises generating a particular similarity score based on the entity name embedding associated with the entity name and the document embedding of the content item;

generating a particular feature value based on the particular similarity score;

wherein inputting the plurality of feature values extracted from the distribution into the binary classifier also comprises inputting the particular feature value into the binary classifier to generate a classification of the entity name, wherein the classification indicates the likelihood of the entity name being associated with the content item.

14. The one or more storage media of claim 11, wherein the content embedding in the plurality of content embeddings of a content item is based on a different word in the content item, wherein the instructions, when executed by one or more processors, further cause:

storing, for the content item in the plurality of content items, a plurality of sentence embeddings, each of which is based on a different sentence in the content item;

wherein generating the plurality of similarity scores based on the similarity measure applied to the entity name embedding associated with the entity name and the content embedding of the plurality of content embeddings also comprises generating a second plurality of similarity scores based on the entity name embedding associated with the entity name and the plurality of sentence embeddings of the content item;

generating one or more feature values based on the second plurality of similarity scores;

wherein inputting the plurality of feature values extracted from the distribution into the binary classifier also comprises inputting the one or more feature values into the binary classifier.

15. The one or more storage media of claim 14, wherein the instructions, when executed by one or more processors, further cause:

computing a mean of the second plurality of similarity scores or a maximum of the second plurality of similarity scores;

wherein the one or more feature values are based on the mean or maximum.

16. The one or more storage media of claim 11, wherein the classification of the entity name reflects a likelihood that the entity name is an accurate entity name for the content item.

17. The one or more storage media of claim 11, wherein identifying the subset of the plurality of entity names comprises:

for the entity name in the plurality of entity names:
identifying a first entity name embedding that is associated with the entity name;
generating one or more similarity scores between the first entity name embedding and one or more embeddings associated with the content item;
including the entity name in the subset only if at least one of the one or more similarity scores is above a particular threshold.

* * * * *